United States Patent [19]

Liertz et al.

[11] 4,248,499
[45] Feb. 3, 1981

[54] SPLICING DEVICE FOR LIGHT WAVE GUIDES

[75] Inventors: Heinrich Liertz, Munich; Dieter Kunze, Neuried; Richard Parstorfer, Germering, all of Fed. Rep. of Germany

[73] Assignee: Siemens Aktiengesellschaft, Berlin & Munich, Fed. Rep. of Germany

[21] Appl. No.: 14,220

[22] Filed: Feb. 22, 1979

[30] Foreign Application Priority Data

Feb. 23, 1978 [DE] Fed. Rep. of Germany ....... 2807799
Feb. 23, 1978 [DE] Fed. Rep. of Germany ....... 2807806

[51] Int. Cl.³ .................................................. G02B 5/14
[52] U.S. Cl. ........................... 350/96.21; 29/466; 65/4 B; 156/158
[58] Field of Search ............... 350/96.20, 96.21, 96.22; 29/460, 464, 466; 65/4 R, 4 A, 4 B; 156/158

[56] References Cited

U.S. PATENT DOCUMENTS

| | | | |
|---|---|---|---|
| 3,768,146 | 10/1973 | Braun et al. | 29/460 |
| 3,912,574 | 10/1975 | Cherin et al. | 350/96.21 X |
| 4,045,121 | 8/1977 | Clark | 350/96.21 |
| 4,047,283 | 9/1977 | Kunze | 29/466 |
| 4,077,702 | 3/1978 | Kunze et al. | 350/96.21 |
| 4,135,783 | 1/1979 | Kunze | 350/96.21 |

FOREIGN PATENT DOCUMENTS

| | | | |
|---|---|---|---|
| 969744 | 6/1975 | Canada | 350/96.21 |
| 2525132 | 1/1977 | Fed. Rep. of Germany . | |
| 2822211 | 11/1978 | Fed. Rep. of Germany | 350/96.21 |
| 1447317 | 8/1976 | United Kingdom | 350/96.21 |
| 1500026 | 2/1978 | United Kingdom | 350/96.21 |

*Primary Examiner*—John K. Corbin
*Assistant Examiner*—John D. Lee
*Attorney, Agent, or Firm*—Hill, Van Santen, Steadman, Chiara & Simpson

[57] ABSTRACT

A device for connecting individual light waveguides or conductors together using a splicing element which has a center portion for receiving and guiding the waveguides and end portions for engaging and gripping the sheath of the waveguides characterized by a pair of holders for holding light waveguides extending at an acute angle to a base of a splicing element which is held in a splicing element holder. The splicing element is movable relative to the ends of the fibers so that the ends of the individual light waveguides are moved towards one another in a centering groove of the center portion of the splicing element and are brought into mutual contact. Each of the holding devices for the light waveguides are mounted to move around a pivot, which lies beneath the plane of the waveguides when moved to a horizontal position and that each of the holders has a clamp for the portion of the light waveguide which is free of the sheath and for the sheath of the light waveguide. Preferably, each of the holders is movable so that a breaking device can operate on the waveguide held in the holder to obtain the desired length, and the splicing elements are designed with a second cover member which clampingly engages the waveguides in the centering groove.

5 Claims, 6 Drawing Figures

SPLICING DEVICE FOR LIGHT WAVE GUIDES

BACKGROUND OF THE INVENTION

The invention relates to a splicing device for light wave guides upon employment of splicing elements with the guidance of the light wave guide ends to be connected in centering grooves and upon employment of mounting devices which are arranged at both sides of the splicing element and accept the ends of the light wave guides to be connected to one another and support them in acute angles to the base of the splicing element, whereby the introduction of the light wave guide ends into the splicing element ensues as a result of a relative movement between the mounting device and the splicing element so that the two ends of the individual light wave guides are moved towards one another in the centering groove of the splicing element and are brought into mutual contact and are fixed.

Because of the small diameter of individual light wave guides it is very difficult and, under certain circumstances, very expensive to produce a junction of light wave guides without axial offset and without angular deviation. Therefore, various ways have been pursued in order to arrive at a satisfying result. One such way led to the use of channel-shaped grooves for the centering and alignment of the individual light wave guides. Such an arrangement is described in the Canadian Pat. No. 969,744. A further example of a splicing element for individual light wave guides is known from the U.S. Pat. No. 4,077,702, in which the splicing element for the acceptance of the individual light wave guides to be connected is formed of surfaces inclined in acute angles towards one another and forming a centering longitudinal groove. A process for joining two high frequency guides is known from the U.S. Pat. No. 3,768,146, according to which a sleeve in which the guides lie abutting bluntly is pressed into a groove and, thereby, is pressed onto the guides. The guides lying in the sleeve are thereby aligned and connected with one another. The groove is preferably of a V-shaped form.

A connecting arrangement for joining individual light wave guides in prismatic guidance grooves is described in the German Pat. No. 2,525,132. The connection arrangement essentially consists of a guidance element exhibiting a groove and of a cap covering the guidance element or, respectively, the groove. The guidance element exhibits a groove with parallel side walls proceeding in the direction of the longitudinal axis, with introducing bevels expanding wedge-shaped and with a wedge-shaped groove bottom and is enclosed by the two lateral sides of a cap covering the groove; the third, middle side of the cap has a projection extending almost to the bottom of the groove and suitable for centering and fixing the inserted individual light wave guide.

Particular difficulties ensue in the support of the sheathings of the light wave guides, since these are usually arranged loosely within the sheathings. Particular measures must be taken for the bridging of tensile forces and compression which influence the sheathings and which must be kept away from the connection location of the light wave guides. In connection arrangements in which the light wave guides are first held in an obtuse angle to one another via the splicing element and are brought into contact with one another by lifting the splicing element, the sheathings are also cemented to the splicing element. In that manner, as is described in the U.S. Pat. No. 4,047,283, for example, a non-extended connection of the light wave guides was created.

SUMMARY OF THE INVENTION

The object of the present invention is to create a splicing device with whose help an extended connection of light wave guides can be produced within channel-shaped grooves, whereby the mounting and supporting of the sheathings is also to be undertaken with this splicing device.

The object is achieved according to the invention in that the holding devices for the light wave guides to be connected are designed in an imaginary plane to be rotatable up to the oppositely aligning orientation; in that the pivots for attaining the rotatability of the holding devices are arranged below the plane in which the clamping elements for the light wave guide ends or, respectively, for the sheathings of the light wave guides lie; in that the holding devices exhibit both clamping elements for the light wave guides as well as clamping elements for the sheathings of the light wave guides; in that the support for the splicing elements is arranged between the holding devices and can be moved in the direction of the holding devices.

The essence of the invention is to be seen therein that a device has been created with which, in a simple manner, an extended connection arrangement for light wave guides can be produced in channel-shaped grooves. A further advantage is also to be seen therein that the sheathings are arranged in the splicing element in such manner that they, too, are secured in an extended form. By so doing, errors which could arise because of the precurvature of the sheathings are avoided. It is a further new feature of the splicing device that both the sheathings as well as the peeled light wave guide ends are held in separate clamping elements. By mounting the light wave guide ends, it is possible to precisely position these. After the light wave guide ends have been secured in the said clamping elements, the support for the splicing element is lifted up together with said splicing element toward the holding devices which carry the clamping elements and are set at an angle until the mutual contacting of the light wave guide ends. After the light wave guide ends are cemented together, the support for the splicing element is lifted further and the holding devices are rotated into the horizontal position so that the light wave guide ends with their sheathings likewise lie horizontally. Now, the sheathings can be connected to the splicing element which preferably exhibits a U-shaped cross section in this area. Thereby, as required, the sheathings are supported and the splicing location itself remains unloaded when external demands are placed on the sheathings. The splicing device can be opened and the finished light wave guide splice can be removed.

Expediently, however, the splicing device is completed by means of a breaking device for light wave guides, whereby the holding devices for the light wave guides can also be employed for this. This has the advantage that the light wave guide ends together with their sheathings need only be clamped once. The arrangement of the breaking device and the holding devices for the light wave guide ends is undertaken in such manner that, by rotating the holding devices, the light wave guide ends can be first brought into the position of the breaking device for cutting and then be brought into the position of the splicing element. By so doing, one guarantees that the length of the light wave guides required for the connection is maintained without readjustment and without further measuring work.

DESCRIPTION OF THE PREFERRED EMBODIMENTS

Figure 1:
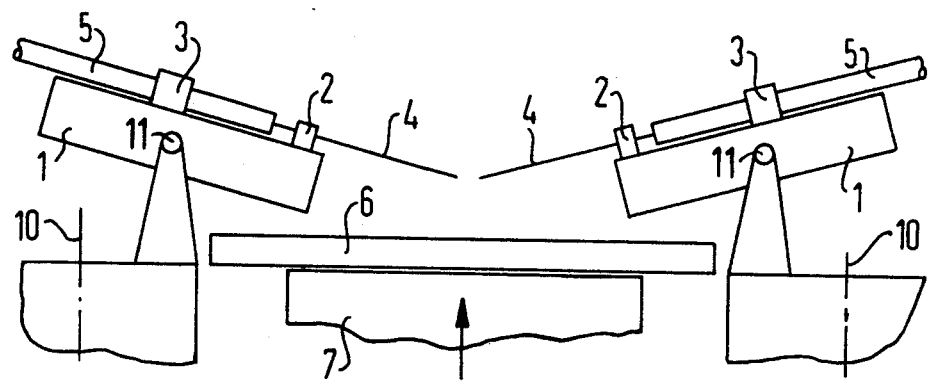
FIG. 1 is a schematic presentation of a splicing device in accordance with the present invention.
Figure 2:
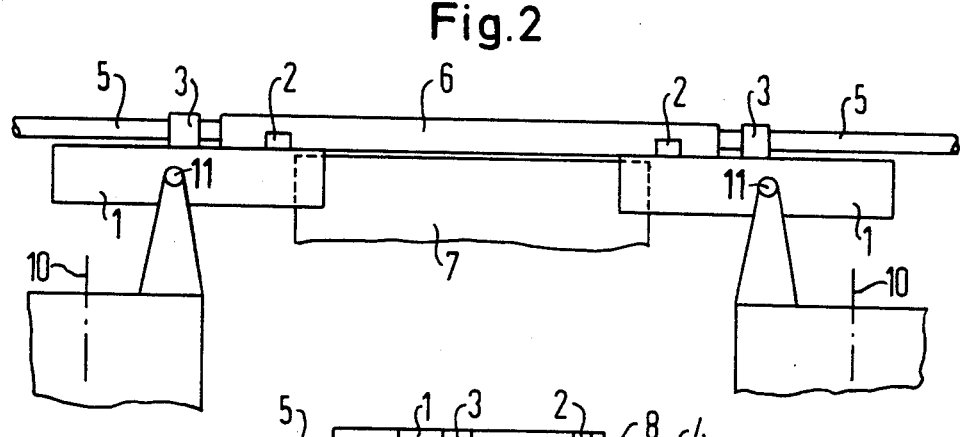
FIG. 2 is a schematic presentation of the splicing device of FIG. 1 in a second working position with the wave-guides being joined together.

FIG. 1 illustrates the work phase after the clamping of the light wave guide ends. The holding devices 1, on which the clamping elements 2 for the peeled light wave guide ends 4 and the clamping elements 3 for the sheathings 5 of the light wave guides are arranged, are tilted towards one another by means of rotating around their axle 11 so that, with a suitable angle, they point from both directions into the centering groove of the splicing element 6. By lifting the support 7 for the splicing element 6, the inclined light wave guide ends 4 are lowered into the groove until they abut. In this position, the light wave guide ends 4 are cemented. After the adhesive has hardened, the holding devices 1 are brought into the horizontal position and the support 7 is further lifted up until the sheathings 5 dip into the expanded edge areas of the splicing element 6. This work phase is illustrated in FIG. 2. In this manner, the required extended connection for light wave guides is brought about. Since the pivot points 11 of the holding devices lie lower than the light wave guide restraint, the light wave guide ends describe a circular arc when the holding devices are rotated into the horizontal position and thus move in such manner that no unallowable excess or underlengths arise which could lead to the rupture of the light wave guide. The sheathings 5 are now cemented to the splicing element 6 in the edge areas and, after the adhesive has hardened, the clamping devices 3 can be opened and the finished light wave guide splice can be removed.

Figure 3:
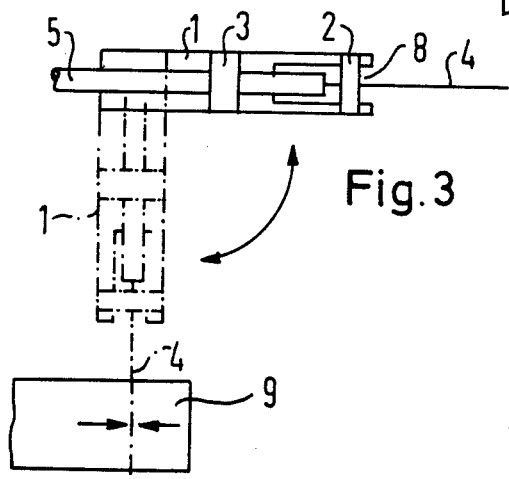
FIG. 3 is a schematic plan view of portion of the splicing device of FIG. 1 illustrating the position of a breaking device associated with each of the holders.

FIG. 3 illustrates the allocation of a breaking device 9 for light wave guides to the position of the holding device 1. The holding device 1, as is indicated in FIGS. 1 and 2, can be rotated around an axis 10 so that it can be brought together with the light wave guide ends 4 clamped in the clamping devices 2 and 3 from the normal position for splicing into the position for the cutting of the light wave guides. In this manner, the light wave guide ends 4 can be immediately cut to the required length. The holding device 1 contains a recess 8 at its end so that the splicing element 6 can be lifted up until it is horizontally aligned with the sheathing 5.

The splicing device is meaningfully complemented by means of this breaking device for light wave guides, since all required work can now be carried out with a single device without repeated adjustments.

It is particularly advantageous to employ a splicing element for permanent connections of individual light wave guides with guidance in centering longitudinal grooves in which a guidance element with centering longitudinal groove is arranged in the center area within a U-shaped designed part, in which an adhesive is introduced into the guidance element in the flushing area of the individual light wave guides and in which the flushing area of the individual light wave guides moistened with adhesive is covered by means of a V-shaped part.

Thereby, it is essential that the connection of the individual light wave guides ensue within the centering groove of a guidance element which is in introduced into the middle of a U-shaped designed part in such manner that the U-shaped part projects on both sides. The fixing of the guidance element can ensue by means of clamping, by means of snapping in, or by means of cementing. The sheathings of the individual light wave guides to be connected can be securely clamped in the areas of the U-shaped designed part which project to both sides in such manner that a mechanical load on the splicing location is excluded. The U-shaped designed part thus assumes the task of intercepting forces. Further, it is very essential that the adhesive introduced for the cementing of the invidividual light wave guides is covered with a V-shaped part in the area of the abutment of the individual light wave guides. This part is adapted to the form of the groove of the guidance element, so that, upon emplacement of this V-shaped part, the adhesive is forced into thin layers. By so doing, the adhesive immediately hardens, so that one can continue with the further work at the connection arrangement. A thin adhesive layer, moreover, is advantageous with respect to avoiding thermal tensions that are too high, which can occur upon later temperature loading. Further, the V-shaped covering part ensures that the light wave guide ends will not lift off. When an adhesive is employed which hardens slowly, the covering V-part is pressed with a spring into the guidance element, so that the light wave guides are first held by means of friction and, after hardening of the adhesive, also by means of adhesion. Thus, even with slowly hardening adhesive, a quick splicing is guaranteed. The V-shaped part for covering the individual light wave guides, however, can itself be designed as a spring element, which, for example, encloses the entire splicing element. By pressing the ends of the U-shaped designed part together which is provided with breaks in this area, the sheathings of the individual light wave guides are fixed.

Figure 4:
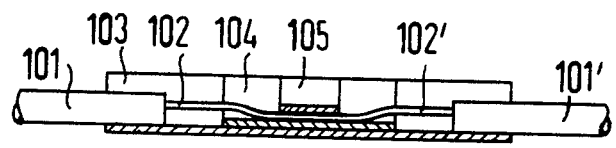
FIG. 4 is a longitudinal cross-sectional view with portions in elevation for purposes of illustration of a splicing element in accordance with the present invention.
Figure 5:
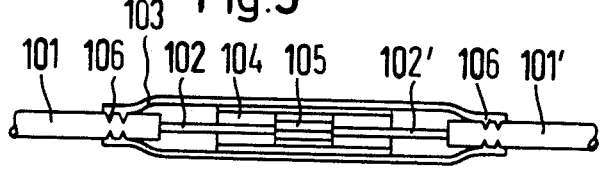
FIG. 5 is a plan view of a splicing element of FIG. 4.
Figure 6:
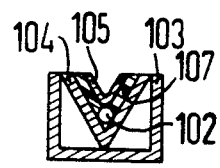
FIG. 6 is a transverse cross section of the element in FIG. 4.

The invention is now explained in greater detail on the basis of FIGS. 4, 5 and 6, in which various views of the splicing element are shown.

The arrangement of the individual parts in the finished assembly state clearly proceeds from FIG. 4. The two individual light wave guides to be connected are conducted from both sides to the U-shaped design part 103, whereby the sheathings 101 and 101' are fixed by means of clamping at their ends. The free ends of the individual light wave guides 102 and 102' are conducted towards one another in the centering groove of the guidance element 104 until mutual contacting and are cemented by means of adhesive. Thereby, the adhesive is covered by means of the V-shaped part 105 and is depicted into thin layers in order to achieve a quick hardening. When slowly hardening adhesives are employed, the part 105 is pressed in the guidance element 104 onto the light wave guides 102 and 102' by means of a spring, so that the light wave guides 102 and 102' are at first held by means of friction. In producing the cable splice, one first begins with the connection of the individual light wave guides in the groove, whereby the covering by means of part 105 is undertaken. Subsequently, the clamping of the sheathings 101 and 101' ensues.

FIG. 5 shows a view of the open side of the splicing element. Here, as in FIG. 4, the entire construction can be seen. The covering of the splicing location by the V-shaped part 105 and the breaks or projections 106 for fixing the sheathings 101 and 101' of the individual light wave guides are thereby particularly clear. The breaks 106 engage into the sheathings without damaging the individual light wave guides which are located loosely therein. In this manner, the splicing location of the individual light wave guides is protected against mechanical loading.

FIG. 6 illustrates how the adhesive 107 is displaced into thin layers by means of the introduction of the V-shaped part 105 into the centering groove of the guidance element 104. In this sample embodiment, the U-shaped designed part 103 exhibits an angular form. However, a rounded form is just as possible, which is of particular advantage at both ends for clamping the sheathings of the individual light wave guides. The centered individual light wave guide 102 which is covered by means of the V-shaped part 105 can be seen in the centering groove of the guidance element 104.

We claim:

1. In a splicing device for connecting light waveguides together utilizing a splicing element having a centering groove for guiding the ends of the light waveguides therein, said splicing device having means for supporting a splicing element, a holding device disposed on each side of the means for supporting a splicing element, said holding device having means for holding an end of a light waveguide at an acute angle to the base of the splicing element, means for moving the holding device and the means for supporting a splicing element relative to each other to cause introduction of the ends of the light waveguides in the splicing element so that both ends of the individual light waveguides are moved towards one another in the centering groove of the splicing element and brought into mutual contact, and means for fixing the contacted ends, the improvement comprising each of the holding devices having clamp means for clamping a portion of a light waveguide which is free of the sheath and also for clamping the sheath of the light waveguide, each of said holding devices being mounted for rotation about a horizontal axis so that the light waveguide can be brought to lie in a horizontal plane, said horizontal axis being disposed below the horizontal plane assumed by the clamping elements of the holding device and the light waveguide, and said means for moving the holding devices and means for supporting moving the means for supporting from a position below said horizontal plane towards said horizontal plane.

2. In a splicing device according to claim 1, wherein each of the holding devices are rotatable about an axis extending perpendicular to said horizontal plane.

3. In a splicing device according to claim 1, wherein the splicing device includes means for breaking the waveguide disposed adjacent each of the holders, each of said holders being rotatable about a second axis extending perpendicular to the horizontal axis from a position for introducing a waveguide into the splicing element into a position where the end of the waveguide is operated on by the breaking device so that the desired length for the waveguide is obtained without any further adjustments.

4. A splicing element for permanently interconnecting a pair of individual light waveguides in an aligned, abutting relationship with the aid of a layer of an adhesive, said splicing element comprising an elongated member having U-shaped cross-section; a guidance element being positioned in a middle portion of the elongated member to leave each end of the member free of the guidance element, said guidance element having a centering longitudinal V-shaped groove for receiving and positioning the light waveguides in an end-to-end abutting connection and for receiving an adhesive at a point of the abutting connection; a cover element having a V-shaped groove cross-section for covering the layer of the adhesive applied to hold the light guides in abutting connection and to apply a frictional force to the light guides; and each of the ends of the elongated member having inwardly directed projections for engaging a sheath of the light waveguide when the ends are inwardly deformed onto the sheath.

5. A splicing element according to claim 4, wherein the elongated member includes means for supporting the guidance element therein.

* * * * *